(No Model.)
O. ZWIETUSCH.
METHOD OF AND APPARATUS FOR CARBONATION OF BEER.
No. 533,519. Patented Feb. 5, 1895.
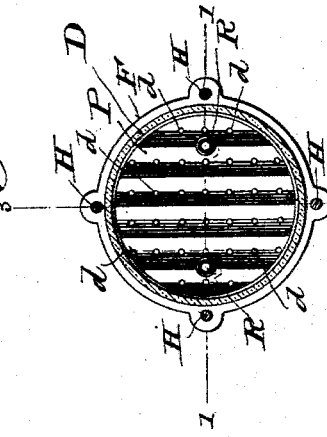
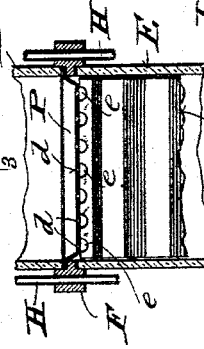
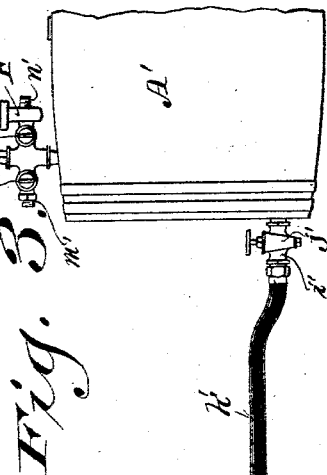
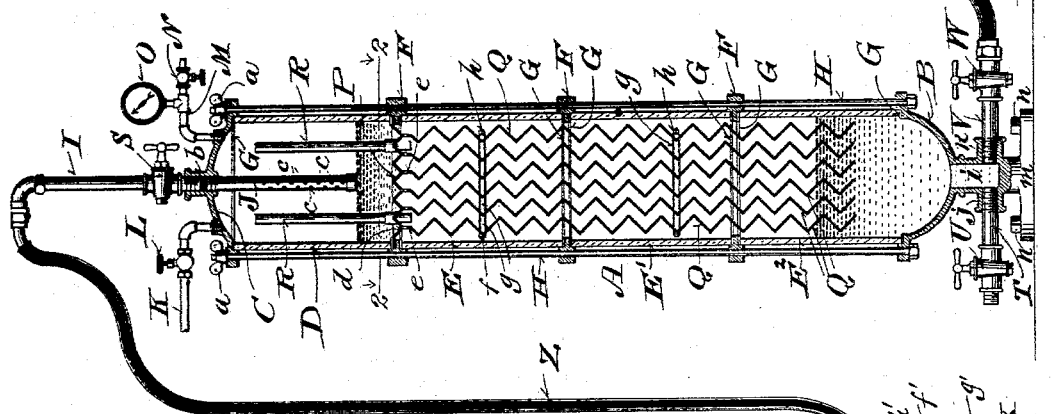
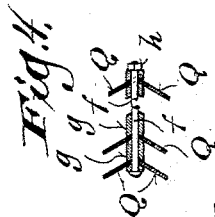
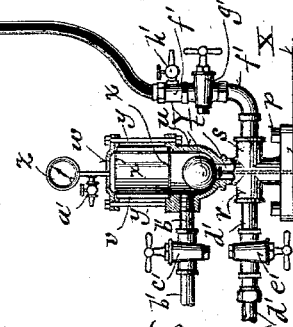
Witnesses
Geo. W. Young
M. S. Underwood
Inventor
Otto Zwietusch,
By H. G. Underwood
Attorney

UNITED STATES PATENT OFFICE.

OTTO ZWIETUSCH, OF MILWAUKEE, WISCONSIN.

METHOD OF AND APPARATUS FOR CARBONATION OF BEER.

SPECIFICATION forming part of Letters Patent No. 533,519, dated February 5, 1895.

Application filed May 22, 1894. Serial No. 512,071. (No model.)

*To all whom it may concern:*

Be it known that I, OTTO ZWIETUSCH, a citizen of the United States, and a resident of Milwaukee, in the county of Milwaukee, and in the State of Wisconsin, have invented certain new and useful Improvements in Methods of and Apparatus for the Carbonation of Beer and other Malt Liquids; and I do hereby declare that the following is a full, clear, and exact description thereof.

My invention relates to the carbonation of beer and other malt liquids, and consists in certain peculiarities of construction and combination of parts in the apparatus employed, as well as in certain peculiarities in the method of carbonation, as will be fully set forth hereinafter, and subsequently claimed.

In the drawings: Figure 1 is a vertical central section through the apparatus forming part of my present invention, partly on the line 1—1 of Fig. 2. Fig. 2 is a horizontal sectional view, taken on the line 2—2 of Fig. 1. Fig. 3, is a detail sectional view, on the line 3—3 of Fig. 2. Figs. 4 and 5 are detail views of portions of the carbonator, drawn to an enlarged scale.

My present invention is designed particularly for the carbonation of malted beverages, especially beer, and the apparatus herein illustrated is of the same general nature and designed to be used similarly to the carbonating apparatus described in my pending application filed February 11, 1893, under Serial No. 461,921, the present improvements consisting, chiefly, in that, during the process of carbonating the beer, or other malt liquid, it is led over a large surface in a thin quiet sheet-like stream, or series of streams, through a column of carbonic acid gas.

It further consists in the construction of a carbonator of several sections, capable of being readily taken apart for cleaning, and further, in making the outer walls of said carbonator sections of glass to admit of a better observation of the operation, and to do away with the liquid-gages on the upper and lower parts of a carbonator made of metal, such as is shown in my prior application hereinbefore referred to.

Referring to the drawings, A represents my improved carbonator, the same having a bottom B, and a top C, both of metal, and a series of separable sections, four being shown in the present illustration, but the exact number being immaterial. In Fig. 1 I have lettered these sections D, E, E' and E², and they are all shown as being made of glass, and while this is a desirable construction, it is only of especial advantage that the upper and lower sections shall be of this material, as this obviates the necessity of using liquid-gages at these points, and permits of a readier and better observation of the operation, as already stated. F F F represent a series of metal rings, interposed between the said sections, there being rubber gaskets, or packing rings, G G, between said metal rings F and the adjacent top and bottom edges of the said sections, as well as a like packing ring G between the top of the upper section D and the under side of the described metal top C of the carbonator, and one between the lower section E² and bottom B of the carbonator.

The sections of the carbonator are held tightly together in place by means of a series of headed vertical rods H H passing through holes in the bottom B, metal rings F F and top C, and secured by nuts $a$ $a$, as shown. The top C is provided with a socketed opening, preferably in the center, forming a pipe coupling, as shown at $b$, having interior screw-threads for the reception of an inlet pipe I, extending for a considerable distance (say for about two feet) above the top C, and an inflow pipe J extending down within the upper section D to a point a short distance above the bottom of this section, this inflow pipe J being capped or closed at its lower end, and provided for a considerable part of its length with a series of perforations $c$ $c$ $c$.

K is a carbonic acid gas inlet pipe, leading through the top C of the carbonator and provided with a cock L.

M is an air and gas outlet pipe, provided with a pressure gage O, and an escape cock N.

P is a perforated and corrugated disk, separating the upper compartment formed by the section D from that immediately below, the perforations $d$ $d$ being formed in the lower angles of the described corrugations, and secured to the said angles of the corrugations of this disk P are a series of depending transversely corrugated plates Q Q Q which extend down through all the compartments formed by the described separable sections to the lower part of the lowest of said compartments, the upper edges of said plates Q being provided with a series of perforations $e\ e$ in line with the described perforations $d\ d$ of the disk P, but of greater size, so as not to offer any obstruction to the flow of the malted liquid through the said perforations in the disk P, and also to permit of the ready passage of the said liquid therethrough, as hereinafter described.

R R represent vertical pipes, passing through and secured to the said disk P, and open at both ends for equalizing the carbonic acid gas in the upper and lower compartments.

S is a cock in the described vertical pipe I.

The plates Q Q are free at their lower ends, and are connected together, at intervals, by headed bolts $f$, spaced the proper distance apart by sleeve-sections $g\ g$, whose ends are beveled to correspond to the shape of the adjacent corrugated portions of the plates Q Q, and secured by nuts $h$, all as best shown, in detail, in Figs. 4 and 5.

The bottom B of the carbonator is provided with an outlet $i$ from the lowest compartment, communicating by means of interiorly screw-threaded socketed openings or couplings, $j, k$, respectively, with a water inlet and outlet pipe T, having a cock U, and a beer outlet pipe V, having a cock W, and said bottom B is further formed with a suitable base, $m$, beneath its standard which contains the described openings or passages $i\ j\ k$, whereby the carbonator may be secured to the floor X of the apartment in which it is located, as by bolts $n\ n$.

I will next describe the beer inlet device. This comprises a suitable base $o$ which can be secured to the floor X, or to a platform upon the same, as by bolts $p\ p$, but there must be an accessible space left beneath said base to permit introduction of a hand to operate the rod $q$, as hereinafter described. This base is provided with a standard, formed preferably integrally therewith, having in the same interiorly screw-threaded openings, or couplings, $r, s$, communicating with an outlet, $t$, leading from the lower part of the bottom $u$ of the beer inlet compartment, which latter is formed by a glass section $v$, having a metal top $w$, the glass and metal parts being separated by interposed rubber gaskets or packing rings $x\ x$, and connected together, and firmly united by means of rods $y\ y$, headed at one end, and screw-threaded and provided with nuts at the other end, all of the construction so far described, from the base $o$ to the top $w$, being practically analogous to that of the carbonator A already described, except that the beer inlet compartment is composed of a single section. The interior of this beer inlet compartment, however, is entirely unobstructed, save for a floating ball valve Y. The top $w$ is provided with a pressure gage $z$ whose pipe is provided with an air-escape cock $a'$, while the bottom $u$ of said beer inlet compartment is provided with a screw-threaded opening for the reception of a beer inlet pipe $b'$, provided with a cock $c'$, and the openings or couplings $r\ s$ in the standard of the base are fitted, respectively, with an outlet pipe $d'$, for turbid beer, as hereinafter explained, said pipe $d'$ having a suitable shut-off cock $e'$, and with a beer outflow pipe $f'$, provided with a shut-off cock $g'$, and an escape cock $h'$, beyond which said pipe $f'$ is connected, by a preferably flexible pipe or tube Z, with the hereinbefore described inlet pipe I of the carbonator A.

In order to prepare my described apparatus for the carbonation of malted beverages, I proceed as follows: The carbonator A is first filled with water, admitted through pipe T, water-cock U and air-cock N being open, and the beer cocks $g'$ and W, cock S, and gas-cock L, being closed. When the carbonator is filled with water, the supply is shut off, so that pipe T may serve as a water outlet, instead of inlet, cock N is closed (as is also escape-cock $h'$ of the beer-inlet apparatus) and cock S and gas-cock L are opened, and carbonic acid gas admitted to the carbonator through pipe K, the pressure of said gas being maintained at from ten to twelve pounds. This will force out the water through pipe T, and when the carbonator is emptied of the water, cock U is closed and escape-cock $h'$ opened, until the pipe Z is also emptied of water, when escape-cock $h'$ is again closed, and the carbonator and all its connecting pipes are filled with carbonic acid gas under the described ten to twelve pounds of pressure, and ready for the reception of the beer to be carbonated. Beer is introduced into the beer inlet compartment through the inlet pipe $b'$, the air within said compartment escaping through cock $a'$, which is closed when the compartment is filled with the beer. Cock $g'$ is left closed, and the float ball Y is raised by means of the described (and suitably packed) hand-rod $q$, thereby opening the outlet $t$, and the cock $e'$ in outlet pipe $d'$ is opened, to permit of the escape of the first flow of the beer, which is turbid, and unfit for use, and which passes out through said pipe $d'$. As soon as the beer runs clear, cock $e'$ is closed, and the beer outflow cock $g'$ is opened, care being taken in the beginning to see that cocks L, and S are open, and that cocks $h'$, N, W, and U, are shut off. The beer inlet apparatus is situated, as shown in the drawings, at a plane practically that of the bottom of the carbonator, and for this reason the pressure of the beer in said inlet apparatus must always exceed the pressure of the gas in the carbonator A in order to produce a proper flow. This excess should be at least two pounds, so that if the pressure of the gas in the carbonator, at this stage of the process, is say fourteen pounds, then the pressure of the beer in the inlet apparatus must be at least sixteen pounds, the gages $z$ and O showing the pressure at all times, and this pressure being controlled by a pressure-regulating device of known construction which is not herein shown, as it forms no novel part of my present invention.

When the apparatus is in operation, and sufficient beer has collected in the bottom of the carbonator, to be seen through the lower glass section E² this will form a seal to prevent the escape of the carbonic acid gas out through the bottom of the carbonator, and this seal must always be maintained during the process of carbonation, and when this requisite quantity of beer is thus visible, the cock W is to be opened to that extent which will maintain the beer at the described level, that is, several inches above the bottom of the carbonator, so that, at all times, this supply of beer will be visible through the lowest glass section E² as stated, and this outflow of the carbonated beer through the pipe V is therefore at all times controlled by said cock W.

The inflow of beer into the carbonator A, through the pipes I and J, is regulated by making the aggregate area of the very minute perforations $c\ c$ in pipe J (which are necessarily exaggerated in the scale shown in the drawings) less than the area of the pipe I in cross-section, the result being that at all times, when the cock S is full opened, the liquid in the pipe J is highly compressed, so that this beer passes out, under the force of the liquid itself, in the form of spray. Similarly, the aggregate area of the openings $c\ c$ just named is greater than the aggregate area of the openings $d\ d$ in the corrugated disk P, so that, at all times while the device is in operation, there will be an accumulation of beer above said disk P, within the upper compartment D of the carbonator, as shown in Fig. 1, these relative proportions being so adjusted that said accumulation of beer above the disk P extends always up to a point slightly below the lowest of the perforations in said pipe J, whereby the said disk P is always completely covered. This accumulation of liquid upon the disk P does not stop the continuous flow of the liquid through the perforations in said disk, and as the accumulation begins to increase in height, the flow increases in rapidity by reason of the increased liquid pressure, and so there is no stoppage, and the height of the liquid above the disk will automatically regulate the speed of its flow therethrough and insure continuous movement.

The object of extending the pipe I for a considerable distance above the top of the carbonator is to insure a steady flow of the beer, or other liquid, even should there be any possible variation of the pressure of the carbonic acid gas within the carbonator, for while it is desirable to maintain the described relative differences of pressure (i. e., at least two pounds) between the beer from the inlet apparatus, and the gas within the carbonator, this is subject to accidental changes, and by the described construction giving always a head of beer within the pipe I, the evils consequent upon any such possible variations are mitigated or obviated.

In order to accomplish the desired result, and to secure the required amount of pressure above the inflow pipe J to produce the described spraying of the beer within the upper compartment of the carbonator A, I have found, by actual practice, that it is essential that the inlet pipe I should extend vertically for a considerable distance above the top of the carbonator, and the higher I have the extension of said vertical pipe I the less will be the effect of any temporary variation in pressure, such as I have just referred to, and hence I regard this upward extending vertical pipe as of great importance and value, as these momentary variations of pressure of the gas within the carbonator are liable to occur from time to time, and as stated I thus obviate their effect. Now, if the extension of the pipe I be say two feet, the compelling pressure at the top of pipe I would be say fifteen pounds (as would be indicated were there a gage at this point) while the pressure within the carbonator is kept as nearly as possible at fourteen pounds, and if this last named pressure should rise, for a moment, up to fifteen pounds, this would not at once stop the flow of the liquid, as that within this extended pipe I would flow by gravity, and by siphoning would draw a little more from the beer inlet to take its place, and by this time the pressure within the carbonator would be restored to fourteen pounds, and thus the operation of the device would not be interrupted by this momentary variation of pressure within the carbonator. This described extension of the pipe I directly from the top also insures a smoother and more direct inflow than would be the case were the beer to enter the carbonator from the side, or if there were a short elbow on the top, and if this pipe I were located within the interior of the carbonator this would require an unnecessary extension of the latter, and, in the illustration given, to build the carbonator two feet higher would occasion considerable extra expense and inconvenience without any beneficial result, all of which is obviated by my construction as shown and described.

The pressure of the carbonic acid gas within the compartments of the carbonator above and below the described disk P is equalized by means of the open pipes R R, already described, said pipes extending above the line of the uppermost perforations $c\ c$ in the pipe J, as shown in Fig. 1.

The object of making the described corrugations in the disk P is to insure an evenly divided discharge of the beer through the perforations $d\ d$, which, as stated, are formed at regular intervals through the lower angles of said corrugations, and which corrugations therefore act as guides for the liquid, and the perforations $e\ e$ in the top ends of the corrugated suspended plates Q, in line with the just described perforations d d, but of larger size, as stated, insure the passage of said liquid on both sides of said plates Q, and by reason of its zig-zag passage, occasioned by the described transverse corrugations of the said plates the liquid is thereby exposed for a greater length of time to the action of the carbonic acid gas than it would be in a direct flow, and as it moves in a very thin and quiet stream, or series of streams, it becomes thoroughly impregnated with said gas before reaching the bottom of the carbonator, the resulting slowness and steadiness of its flow preventing the foaming of the liquid.

A' represents a cask or other receptacle for the carbonated liquid, having a faucet $i'$, provided with a suitable cock $j'$, said faucet being connected, as by flexible pipe $k'$, with the beer outflow pipe V of the carbonator A. The receptacle A' is further shown as being provided with a double cock B' C', pressure gage D' and regulating blow-off valve F', the latter being adjacent to the cock C', while the cock B' controls the admission of compressed air through pipe-coupling $m'$, with which air (under a pressure several pounds less than the pressure of the gas in the carbonator) the said receptacle A' is filled before the beginning of the operation. The gage D' shows the amount of pressure, which is regulated according to the height at which the receptacle A' is located, and if it is on the same plane as the base of the carbonator, as shown in the drawings, this pressure should be not less than seven or eight pounds, to the described fourteen pounds within the carbonator, but it must always be less than said pressure within the carbonator to insure the flow of the liquid, and if the pressure of the liquid as it enters the receptacle A' exceeds the pressure to which the valve F' is set, the excess blows off or escapes through the pipe $n'$ of said valve. This produces the counter-pressure required for the steady operation of the carbonator and for keeping the beer or other malted liquid under proper pressure, after it is carbonated until it is drawn off, either through a filter, or directly into shipping casks.

It will be understood that where I have used the word "beer" throughout the specification, it is for convenience and brevity, and that this term is to be understood as including all malted beverages, no matter by what names they are technically or individually known.

While I have illustrated and particularly described a novel and convenient apparatus for carrying my method into effect, it will be understood that my invention is not limited to said apparatus, as my method can be carried out by means of devices of widely different construction, so long as the same are capable of use, in the manner set forth in my method claims, for accomplishing the desired result, and also, that while I have found the exact form of apparatus illustrated to work admirably in practice, I do not wish to be understood as being confined to the precise details shown. For example, I obtain excellent results from leading the liquid in a thin or shallow quiet stream over a large surface, within the gas-charged carbonator, whether said surface is corrugated or not, and this I believe to be broadly new, and useful, but by adding the corrugations the liquid in transit is exposed for a greater length of time to the action of the gas, and this is an added advantage, though not a necessary limitation of my invention.

Having thus described my invention, what I claim as new, and desire to secure by Letters Patent, is—

1. The method of carbonating beer and other malt liquids, which consists in supplying the said liquid to an inlet receptacle, forcing it from there to a point above the plane of said receptacle, passing it into an inlet pipe communicating with the top of a carbonator located a considerable distance below the top of said inlet pipe, filling the said carbonator with carbonic acid gas at a less pressure than that of the liquid in said inlet receptacle, admitting the liquid to the upper part of said carbonator in the form of fine spray, and retarding its downward flow at that point, passing the liquid through said carbonator in a thin or fine stream or series of streams in the presence of said gas, and retarding or collecting the liquid in the lower part of the carbonator, admitting compressed air into a suitable receptacle at a pressure less than the pressure of the gas in the carbonator, and passing the liquid out from the lower part of the carbonator, in a regulated flow, into said receptacle against the described counter-pressure within the latter.

2. In apparatus for the carbonation of beer and other malt liquids, the combination with a carbonator of a vertically extended inlet pipe projecting upward from the top thereof, a communicating inflow pipe, projecting downward within the upper part of said carbonator, said inflow pipe being closed at its lower end and provided with minute transverse perforations, and a corrugated and perforated disk extending entirely across the interior of said carbonator on a plane below the bottom of said inflow pipe.

3. In apparatus for the carbonation of beer and other malt liquids, the combination with a carbonator of a gas inlet pipe, a liquid inflow pipe, a perforated disk extending entirely across the interior of the carbonator and a vertically disposed plate or series of plates suspended within the carbonator from the underside of said perforated disk.

4. In apparatus for the carbonation of beer and other malt liquids, the combination with a carbonator of a gas inlet pipe, a liquid inflow pipe, a perforated disk extending entirely across the interior of said carbonator, and a plate or series of plates suspended from said disk and formed with transverse corrugations for receiving and guiding said liquid, and retarding it, while it is exposed to the action of the gas as it passes through said carbonator.

5. In apparatus for the carbonation of beer and other malt liquids, the combination with a carbonator of a gas inlet pipe, a liquid inflow pipe, a perforated and corrugated disk extending entirely across the interior of said carbonator, and a plate or series of plates suspended from said disk, the said plate or plates being secured to the lowest angle or angles of the corrugation or corrugations of said disk, and provided, at the point or points of union with openings in line with those in said disk, but of greater size, to insure the passage of said liquid on both sides of said plate or plates.

6. In apparatus for the carbonation of beer and other malt liquids, the combination with a carbonator of a gas inlet pipe, a liquid inflow pipe provided with a closed lower end and a series of minute transverse perforations, a corrugated disk extending entirely across the interior of said carbonator below the plane of the bottom of said inlet pipe, and provided with perforations through the lowest angles of said corrugations of less aggregate area than the aggregate area of the perforations in said inflow pipe, a series of plates suspended from said lowest angles of said corrugations in said disk, and provided at their points of union with openings in line with those in said disk but of greater size, and a gas equalizing pipe or series of pipes extending vertically through said disks, and open at each end, the upper termination of said pipe or series of pipes being on a plane above that of the uppermost of the said transverse perforations in said inflow pipe.

7. In apparatus for the carbonation of beer and other malt liquids, the combination with a carbonator of a gas-inlet pipe, a liquid inflow pipe, a perforated disk extending entirely across the interior of said carbonator, a series of transversely corrugated plates suspended from said disk, and free at their lower ends, series of sleeve sections separating said plates, and formed with beveled ends corresponding in shape to the adjacent corrugations of said plates, and series of bolts passing through said sleeve-sections and through said plates and provided with fastening devices to keep said plates connected together, but separated the proper distance apart.

8. In apparatus for the carbonation of beer and other malt liquids, the combination of a carbonator having a suitable top and bottom provided with suitable gas and liquid inlets and outlets, an intermediate series of separable sections, a series of rings interposed between said sections, a series of gaskets or packing rings interposed between said last named rings and the adjacent edges of said sections, and between the upper section and top, and the lower section and bottom, of said carbonator, and exterior fastening rods passing continuously through said top and bottom of the carbonator and through the said rings between said sections and provided with securing devices for holding the parts firmly together the outer walls of the upper and lower sections of said carbonator being of transparent material, and the said rings being centrally reduced or shouldered on their inner peripheries to afford lateral support to the walls of all the separable sections.

9. In apparatus for the carbonation of beer and other malt liquids, the combination with a carbonator of a liquid inlet device comprising a suitable base, a standard rising therefrom and having a passage communicating with the bottom of the inlet compartment, a suitably packed separable section resting on said bottom, a suitably packed top resting on said section, an air-pipe rising from said top and terminating in a pressure gage and provided with an air-escape cock, suitable fastening devices for securing the top, bottom, and intermediate section together, a cock-controlled liquid inlet pipe leading through said bottom, a floating ball valve within the inlet compartment and normally resting on the outlet in the bottom of the same, a cock-controlled liquid escape pipe communicating with said outlet, and a liquid outflow pipe leading from said outlet, a pipe or tube leading from said outlet pipe to the carbonator, suitable cocks on said last named pipes, and a hand-rod passing through the passage in the said standard for raising the said floating ball valve to permit the passage of the liquid through said inlet compartment.

10. In apparatus for the carbonation of beer and other malt liquids, the combination with a carbonator, and a liquid outlet pipe leading therefrom, of a receptacle for the carbonated liquid, a cock-controlled faucet in said receptacle, a tube or pipe leading from the said liquid outlet of the carbonator to the said faucet of the receptacle, a double cock on the said receptacle, provided with a pressure gage, a pipe-coupling for connecting a compressed-air pipe with said double cock, and a regulating blow-off valve also communicating with said double-cock.

In testimony that I claim the foregoing I have hereunto set my hand, at Milwaukee, in the county of Milwaukee and State of Wisconsin, in the presence of two witnesses.

OTTO ZWIETUSCH.

Witnesses:
H. G. UNDERWOOD,
C. W. SCOTT.